United States Patent [19]

Akao

[11] Patent Number: 4,778,713
[45] Date of Patent: Oct. 18, 1988

[54] WRAPPING PAPER FOR THERMOSENSITIVE RECORDING MATERIALS

[75] Inventor: Mutsuo Akao, Kanagawa, Japan

[73] Assignee: Fuji Photo Film Co., Ltd., Kanagawa, Japan

[21] Appl. No.: 37,998

[22] Filed: Apr. 14, 1987

[30] Foreign Application Priority Data

Apr. 15, 1986 [JP] Japan .............................. 61-55389[U]

[51] Int. Cl.⁴ ......................... B32B 27/00; B32B 5/16
[52] U.S. Cl. ................................. 428/215; 428/218; 428/408; 428/537.5; 428/513; 428/516; 428/461; 428/323; 206/455
[58] Field of Search ............... 428/215, 218, 408, 513, 428/537.5

[56] References Cited

U.S. PATENT DOCUMENTS

| | | |
|---|---|---|
| 4,147,291 | 4/1979 | Akao et al. . |
| 4,258,848 | 3/1981 | Akao et al. . |
| 4,263,360 | 4/1981 | Adelman .......................... 428/513 X |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. ...................... 428/483 X |
| 4,386,124 | 5/1983 | Akao . |
| 4,411,943 | 10/1983 | Akao . |
| 4,411,945 | 10/1983 | Akao et al. . |
| 4,436,809 | 3/1984 | Akao et al. . |
| 4,452,846 | 6/1984 | Akao ................................ 428/513 X |
| 4,469,741 | 9/1984 | Akao . |
| 4,513,050 | 4/1985 | Akao . |
| 4,565,733 | 1/1986 | Akao . |
| 4,565,743 | 1/1986 | Akao . |
| 4,576,865 | 3/1986 | Akao . |
| 4,579,781 | 1/1986 | Akao . |
| 4,584,234 | 4/1986 | Hirose et al. ................... 428/513 X |
| 4,587,175 | 5/1986 | Akao . |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |

*Primary Examiner*—P. C. Ives
*Attorney, Agent, or Firm*—Burns, Doane, Swecker & Mathis

[57] ABSTRACT

A wrapping paper thermosensitive recording materials comprising a light-reflecting paper layer which is located as the outer surface layer and a light-shielding paper layer which is located on the inside therefrom and which is integrally combined with said light-reflecting paper layer.

The wrapping paper of the invention shields from the external heat and light. When internal humidity is increased such as by heating of the package such as at higher than 50° C., moisture passes through the wrapping paper to the outside. Accordingly, fogging by precoupling of the wrapped thermosensitive recording materials remarkably decreased, and quality of the recording material could be maintained for a long period during storage.

7 Claims, 2 Drawing Sheets

WRAPPING PAPER FOR THERMOSENSITIVE RECORDING MATERIALS

BACKGROUND OF THE INVENTION

1. Field of the Invention

This invention relates to a wrapping paper for thermosensitive recording materials. More particularly, this invention relates to a wrapping paper suitable for the diazo thermosensitive recording materials having a recording layer containing a diazonium salt, a coupling component and a coloring assistant provided on a fixable support. In the above recording layer, at least one of the diazonium salt, the coupling component and the coloring assistant is incorporated in microcapsules together with an organic solvent (except that the above three components cannot be contained in the same microcapsule).

2. Description of the Prior Art

Recently, the thermosensitive recording method has spread in the fields of facsimile and printer. As the thermosensitive recording method materials for the above recording, leuco coloring thermosensitive recording materials were employed. The leuco coloring thermosensitive recording materials are superior in color concentration and coloring rate, but they have the following problems. That is, even after recording, they are stained by coloring caused by heating or adhesion of solvents, and moreover, they are decolored by a plasticizer such as contained in cellophane adhesive tape. In order to solve these defects, diazo thermosensitive recording materials have been developed. In the recording materials, a recording layer containing a diazonium salt, a coupling component and an alkali generator or a coloring assistant is provided, and after recording, unreacted diazonium salt is decomposed by light irradiation to lose its coloring ability (Japanese Patent KOKAI Nos. 57-123086 and 57-125092). However, in such diazo thermosensitive recording materials, precoupling gradually proceeds during preservation, and undesirable fogging occasionally appears. In order to avoid this fogging, either of the coupling component or the coloring assistant is made nonpolar with waxy material (Japanese Patent KOKAI Nos. 57-4414 and 57-142636) or capsules with a hydrophobic macromolecular material (Japanese Patent KOKAI No. 57-192944) and thereby it is isolated from other components. Besides, it is also known that preservability is improved by providing a protective coat of linear polystyrene resin of which molecular weight is higher than 10,000. Particularly, fixation type diazo thermosensitive recording materials recently developed are superior because they have no such problems. The fixation type recording material has a recording layer containing a diazonium salt, a coupling component and a coloring assistant provided on a fixable support, and at least one of the above three components is incorporated in microcapsules together with an organic solvent. In the case of this fixation type recording material, microcapsules are not ruptured at the time of coloring reaction but the above reactive substances existing in and out of the microcapsules pass through the wall of the microcapsules by heating.

As the package for the thermosensitive recording materials requiring light shielding properties such as the foregoing diazo thermosensitive recording materials, the packaging materials for photographic photosensitive materials including diazo photographic photosensitive materials were usually employed. The packaging materials for photographic photosensitive materials require various properties such as light-shielding, gas barrier, moistureproofness, antistatic property, physical strengths such as breaking strength, tear strength, impact puncture strength, Gelbo test strength and wear resistance, heat sealing properties such as heat seal strength, hot tack properties (hot-seal ability) and seal ability of contraries, flatness, slipping character and the like.

Generally, it is difficult to satisfy these properties by a single material. Therefore, a single layer film of a high-pressure low-density polyethylene (LDPE) kneaded with carbon black or a pigment, or a composite laminated film composed of a LDPE film and a flexible sheet such as paper, aluminum foil or cellophane, etc. has been employed. An example of a single layer wrapping film is shown in FIG. 5. This film consists of a light-shielding LDPE film layer 5. Some examples of composite wrapping films are shown in FIGS. 6–9. The film of FIG. 6 is composed of a light-shielding LDPE film layer 5 and a flexible sheet layer 6. The film of FIG. 7 is composed of a light-shielding flexible sheet layer 7 and a LDPE film layer 8. The film of FIG. 8 is composed of a light-shielding LDPE film layer 5, a light-shielding metal foil layer 3 and a flexible sheet layer 6. They are laminated in that order, and an adhesive layer 4 is provided between each layers. The film of FIG. 9 is composed of a light-shielding paper layer 1 and a light-reflecting paper layer 2 laminated on it through an adhesive layer 4.

However, when a diazo thermosensitive recording material was coiled round the core and wrapped up in the above film, fogging caused by precoupling occasionally appears during transportation or storage.

SUMMARY OF THE INVENTION

An object of the invention is to provide a wrapping paper capable of preserving diazo thermosensitive recording materials for a long period without fogging.

In order to achieve this object, the inventor has investigated and has found that the precoupling was caused by the structure of wrapping film. That is, the foregoing conventional wrapping film contains plastic layer(s) such as a polyethylene film layer being 50–100 μm thick, and therefore, the wrapped recording material is put in a closed state, and heat and moisture are liable to accumulate in the package. Thereupon, when the wrapped recording material is placed in the sunshine or at high temperature, precoupling of the diazo compound proceeds by heat and moisture.

Thus, the wrapping film of the invention has good water vapor permeability and thermal-shielding in addition to the fundamental properties as the packaging materials for thermosensitive recording materials such as light-shielding and physical strength. Such a wrapping film of the invention is substantially made of paper comprising a light-reflecting paper layer which is located as the outer surface layer and a light-shielding paper layer which is located on the inside therefrom and which is integrally combined with the above light-reflecting paper layer.

DETAILED DESCRIPTION OF THE INVENTION

Figure 1:
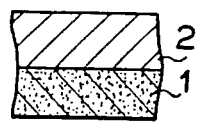
FIGS. 1 and 2 are partial sectional views of the wrapping papers embodying the invention.

The light-reflecting paper layer is white, yellow, brown, a light color, silver, gold, or the like. Water vapor permeability based upon JIS Z-0208 is more than 50 g/m$^2$·24 hours, preferably more than 100 g/m$^2$·24 hours. In view of securing the water vapor permeability, physical strength and printability, the density of the light-reflecting paper layer is usually 0.7 to 1 g/cm$^3$, preferably 0.8 to 0.95 g/cm$^3$, and its thickness is usually 20 to 150 μm, preferably 30 to 90 μm. As the light-reflecting paper layer, unbleached kraft paper, semi-bleached kraft paper, bleached kraft paper, unglazed kraft paper, unglazed bleached kraft paper, pure white wrapping paper, pure white machine-glazed paper, machine-glazed bleached kraft paper, ribbed kraft paper, duostress paper, raw baryta paper, clupak paper, machine-glazed kraft paper, thin simili, wood-free paper, shoji paper, raw art paper, raw coated paper, non-woven fabric, and the like are usable. Among them, white machine-glazed paper and bleached kraft paper are preferable.

The light-shielding paper layer is the paper colored to a light-absorptive color such as black, red or blue with dye, pigment or metal powder. As the coloring material, carbon black is preferable because of superior light-shielding, minor impurities and inexpensiveness. The most preferable light-shielding paper layer is a black paper colored with 1 to 15 wt. % of carbon black. Water vapor permeability of the light-shielding paper layer based upon JIS Z-0208 is more than 50 g/m$^2$·24 hours, preferably 100 g/m$^2$·24 hours. In view of securing light-shielding and the above water vapor permeability, the density of the light-shielding paper is usually 0.7 to 1 g/cm$^3$, preferably 0.8 to 0.95 g/cm$^3$, and its thickness is usually 15 to 150 μm, preferably 50 to 120 μm. The light-shielding paper layer may be selected from the enumerated in the foregoing light-reflecting paper layer, and colored to use. Light-backing paper for photographic purpose is also usable.

The light-reflecting paper layer is integrally combined with the light-shielding paper layer. These two layers are made as a combination paper by a paper machine. Accordingly, no adhesive layer is provided between them.

Other layer(s) such as a paper layer or another layer having water vapor permeability may be combined with the above combination paper.

The combination paper consisting of two or more layers may be made by a cylinder machine, a double slice Fourdrinier machine or an Inverform machine having three slices.

In any event, water vapor permeability of the wrapping paper based upon JIS Z-0208 is preferably more than 50 g/m$^2$·24 hours. Its density is preferably 0.7 to 1 g/cm$^3$, and its thickness is preferably 50 to 250 μm.

The light-reflecting paper layer is located as the outer surface layer. While, the light-shielding paper layer is sufficient to be located on the inside therefrom, and it is not necessary to be located as the inner surface layer.

Figure 4:
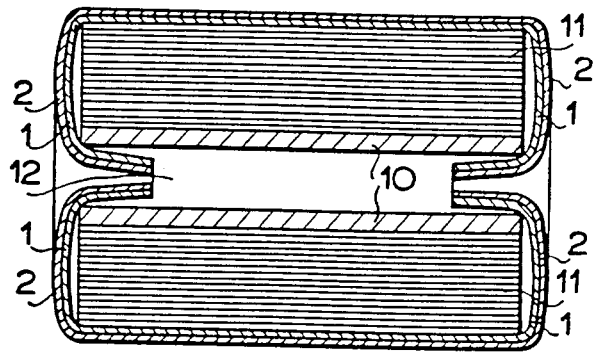
FIG. 4 is a sectional view indicating a packaging form of a roll of diazo thermosensitive recording material.

As the form of wrapping, the wrapping paper is coiled once or several times, preferably twice or three times, on a roll of thermosensitive recording materials in a cylindrical form, and both side ends are turned and inserted into both open ends of the core body, as shown in FIG. 4. While, the wrapping paper may be rounded to form a tube. In this case, both side ends are pasted together in a form of superposition or back lining. A roll of the recording material is inserted into the tube, and both ends of the tube are turned and inserted into both open ends of the core body. The wrapping paper may first be formed into a bag by pasting each open edges of a superposed wrapping papers leaving one open edge. A roll of the recording material is inserted into the bag, and its open end is turned and inserted into an open end of the core body. After the insertion of the wrapping paper, a square or circular bush made of foamed polystyrene or other materials is fitted to each open end in order to protect the recording material during transportation. This bush is slightly larger than the roll of the recording material packaged with the wrapping paper in diameter, and a projection for fitting is formed at its center. In any form of the above, open end(s) of the packaging paper may be sealed instead of or in addition to the above insertion into the core body. The use of the wrapping paper of the invention is not limited to the above forms, and it may be used for any wrapping form of thermosensitive recording materials.

The wrapping paper of the invention is utilizable for any thermosensitive recording material, however, it is effective as the wrapping paper for the fixation type diazo thermosensitive recording materials. This recording material has a recording layer containing a diazonium salt, a coupling component and a coloring assistant provided on a fixable support, and at least one of the above three components is contained in microcapsules together with an organic solvent. In the case of this fixation type recording material, the microcapsules are not ruptured at the time of coloring reaction but the above reactive substances existing in and out of the microcapsules pass through the wall of the microcapsules by heating. By the presence of an organic solvent, fogging during preservation remarkably decreases, and coloring rate and concentration remarkably increases.

The diazonium salt has a general formula $ArN_2^+X^-$ where Ar represents a substituted or unsubstituted aryl group, $N_2^+$ represents diazonium, and $X^-$ represents an acid anion. This diazonium salt reacts with a coupling component to form a color, and it is decomposed by light. The diazonium compound to form the above salt includes 4-diazo-1-dimethylaminobenzene,
4-diazo-1-diethylaminobenzene,
4-diazo-1-dipropylaminobenzene,
4-diazo-1-methylbenzylaminobenzene,
4-diazo-1-dibenzylaminobenzene,
4-diazo-1-ethylhydroxyethylaminobenzene,
4-diazo-1-diethylamino-3-methoxybenzene,
4-diazo-1-dimethylamino-2-methylbenzene,
4-diazo-1-benzoylamino-2,5-diethoxybenzene,
4-diazo-1-morpholinobenzene,
4-diazo-1-morpholino-2,5-diethoxybenzene,
4-diazo-1-morpholino-2,5-dibutoxybenzene,
4-diazo-1-anilinobenzene,
4-diazo-1-toluylmercapto-2,5-diethoxybenzene and
4-diazo-1,4-methoxybenzoylamino-2,5-diethoxybenzene.

Examples of acid anion include $C_mF_{2m+1}COO^-$ (m is 3–9), $C_nF_{2n+1}SO_3^-$ (n is 2–8), $(C_pF_{2p+1}SO_2)_2CH^-$ (p is 1–18),

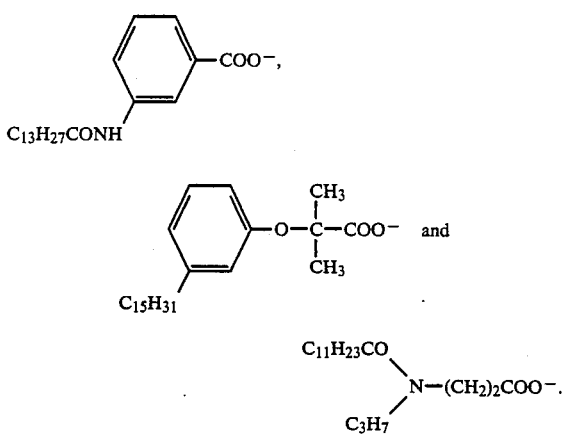

Such a diazonium salt is dissolved or suspended in an organic solvent, and microcapsules containing this solution or suspension are made by polymerization of a raw material for wall materials such as interfacial polymerization, external polymerization or internal polymerization to form the wall material of microcapsules. The wall material does not necessarily to melt by heat at the time of coloring reaction, and the melting point of the wall material is preferably high because preservability of unused recording material is rather raised. As the wall material, polyurethane, polyurea, polyamide and polyester are preferable.

The organic solvent is water-insoluble and its boiling point is preferably higher than 180° C. Suitable organic solvents include phosphoric acid esters, phthalic acid esters, other carboxylic acid esters and fatty acid amides. Dibutyl phthalate, diethyl phthalate, dibutyl maleate and tricresyl phosphate are particularly preferable. Other components, i.e. a coupling component and a coloring assistant, may also be entrapped into microcapsules similarly. However, when all reactive components, i.e. a diazonium salt, a coupling component and a coloring assistant, are contained in the same microcapsule, fogging proceeds irrespective of the package of the invention.

Diazo thermosensitive recording materials are explained in detail by H. Sato (Nippon Kagaku Zasshi, 11, 2111–2115 (1985)).

The wrapping paper of the invention shield from the external heat and light. When internal humidity is increased such as by heating at higher than 50° C., moisture passes through the wrapping paper to the outside. Accordingly, fogging by precoupling of the wrapped thermosensitive recording materials is remarkably decreased, and the quality of the recording material could be maintained for a long period during storage.

EXAMPLES

An example of the wrapping paper of the invention is shown in FIG. 1. This wrapping paper is a combination paper of a light-reflecting paper layer 2 and a light-shielding paper layer 1 made by a cylinder machine.

Figure 2:
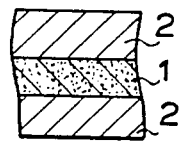

Another example of the wrapping paper of the invention is shown in FIG. 2. This wrapping paper is a combination paper consisting of a light-reflecting paper layer 2, a light-shielding paper layer 1 and another light-reflecting paper layer 2.

Figure 3:
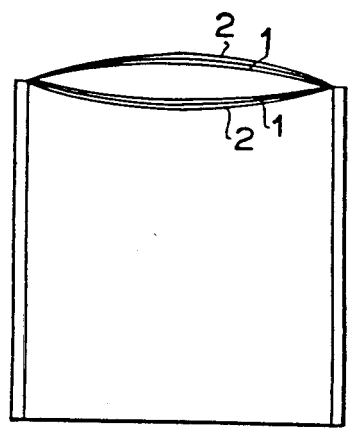
FIG. 3 is a perspective view indicating a bag made of a wrapping paper of the invention.

A bag made of the wrapping paper of the invention is shown in FIG. 3. The wrapping paper is turned up so that the light-shielding paper layer 1 is located on the inside, and both sides are pasted. A roll of thermosensitive recording material is put into the bag, and then, the opening of the bag is turned and inserted into the open end of the core body of the roll.

FIG. 4 is a sectional view indicating a diazo thermosensitive recording material wrapped by an example of the wrapping paper of the invention.

As shown in this drawing, a diazo thermosensitive recording material 11 is coiled round a cylindrical core 10 to form a roll, and its end is fastened by an adhesive tape. A wrapping paper is coiled twice thereon in a cylindrical form, and both ends are turned and inserted into the central hollow part 12 of the core 10.

Subsequently, occurrence of fogging was tested as to the wrapping papers of the invention, and the results were compared with other wrapping papers.

The wrapping paper of Example 1 corresponds to the embodiment of FIG. 1. The light-shielding paper layer 1 was made of 67 wt. % of hardwood pulp (LP), 27 wt. % of softwood pulp (NP) and 6 wt. % of carbon black. Its density was 0.92 g/cm$^3$, and its thickness was 67 μm. The light-reflecting paper layer 2 was made of 60 wt. % of LP and 40 wt. % of NP, and its thickness was 55 μm.

The wrapping paper of Example 2 also corresponds to the embodiment of FIG. 1. Thickness of the light-shielding paper layer 1 was 87 μm, and its composition was the same as Example 1. The light-reflecting paper layer 2 was the same as Example 1.

Figure 9:
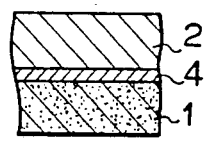

Comparative wrapping film 1 corresponds to the embodiment of FIG. 9. The composition of the light-shielding paper layer 1 was the same as Example 1, and its thickness was 75 μm. The light-reflecting paper layer 2 was white bleached kraft paper being 0.89 g/cm$^3$ in density and 67 μm in thickness, and it was laminated through the LDPE resin adhesive layer 4 being 20 μm in thickness by extrusion laminating.

Figure 5:
FIGS. 5 to 9 are partial sectional views of conventional wrapping films.

Conventional wrapping film 1 corresponds to the embodiment of FIG. 5. The light-shielding LDPE film layer 5 contained 3 wt. % of carbon black, and its thickness was 70 μm.

Figure 6:
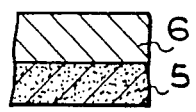
Figure 7:
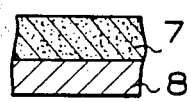
Figure 8:
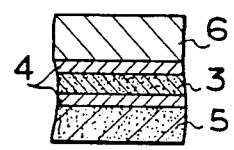

Conventional wrapping film 2 corresponds to the embodiment of FIG. 6. The flexible sheet layer 6 was unbleached kraft paper of 0.87 g/cm$^3$ in density and 80 μm thick, and the light-shielding LDPE film layer 5 being 30 μm thick contained 3 wt. % of carbon black and was provided by extrusion laminating.

In the above Comparative and Conventional examples, "DFD-0111" (MI; 2.4 g/10 minutes, Density; 0.923 g/cm$^3$, NIPPON UNICAR Co., Ltd.) was employed as LDPE in the light-shielding LDPE film layer 5, "MIRASON 14" (MI; 5.1 g/10 minutes, Density; 0.919 g/cm$^3$, MITSUI POLYCHEMICALS Co., Ltd.) was employed as the LDPE resin adhesive layer, and "#44B OIL FURNACE CARBON BLACK" (Mean Particle Size; 21 mμ, pH 7.7, MITSUBISHI CHEMICAL INDUSTRIES Ltd.) was employed as the carbon black, respectively.

The recording material wrapped in each wrapping film was a fixation type diazo thermosensitive recording material of 100 meters length, and coiled on a paper core of 210 mm length and 3 inches inside diameter.

This recording material was wrapped by each wrapping film in a form of FIG. 4.

Then, each example was placed in a thermostatic oven, and allowed to stand at 55° C. for 42 hours. Subsequently, each recording material was taken out, and fogging was measured to determine its Macbeth density.

The results are shown in the following table.

|  | Invention | | Comparative | Conventional | |
|---|---|---|---|---|---|
|  | 1 | 2 | 1 | 1 | 2 |
| Layer Constitution | FIG. 1 | FIG. 1 | FIG. 9 | FIG. 5 | FIG. 6 |
| Fogging | B | B | E | E | E |
| (Macbeth Density) | 0.138 | 0.152 | 0.383 | 0.987 | 0.574 |
| Printability | A | A | A | D | C |
| Thermal-Shielding | B | B | B | E | C |
| Light-Shielding | B | B | B | B | B |

Evaluations in the above table were carried out as follows:
A: Very Excellent
D: Having a Problem
B: Excellent
E: Impractical
C: Practical Testing methods were as follows;
Thickness: JIA P-8118
Water Vapor Permeability: JIS Z-0208
Light-Shielding Character: A diazo thermosensitve recording material was wrapped by each wrapping film, and then exposed to the light of 80,000 luxes for one hour. The light-shielding character was estimated by the fogging degree of the diazo thermosensitive recording material.

I claim:

1. A wrapping combination paper for diazo thermosensitive recording materials made by a paper machine comprising a light-reflecting paper layer which is located at the outer surface layer and a light-shielding paper layer which is located on the inside therefrom and which is integrally combined with said light-reflecting paper layer without an adhesive layer, said wrapping combination paper having a water vapor permeability more than 50 g/m$^2$·24 hours.

2. The wrapping paper of claim 1, wherein color of said light-reflecting paper layer is white, yellow, brown, a light color, silver or gold.

3. The wrapping paper of claim 2, wherein said light-reflecting paper layer is 0.7 to 1 g/cm$^3$ in density and 20 to 150 μm in thickness.

4. The wrapping paper of claim 3, wherein said light-reflecting paper layer is white machine-glazed paper or bleached kraft paper.

5. The wrapping paper of claim 1, wherein said light-shielding paper layer is a black paper containing 1 to 15% by weight of carbon black.

6. The wrapping paper of claim 5, wherein said light-shielding paper layer is 0.7 to 1 g/cm$^3$ in density and 15 to 150 μm in thickness.

7. The wrapping paper of claim 1, wherein said diazo thermosensitive recording materials are of the fixation type.

* * * * *